UNITED STATES PATENT OFFICE.

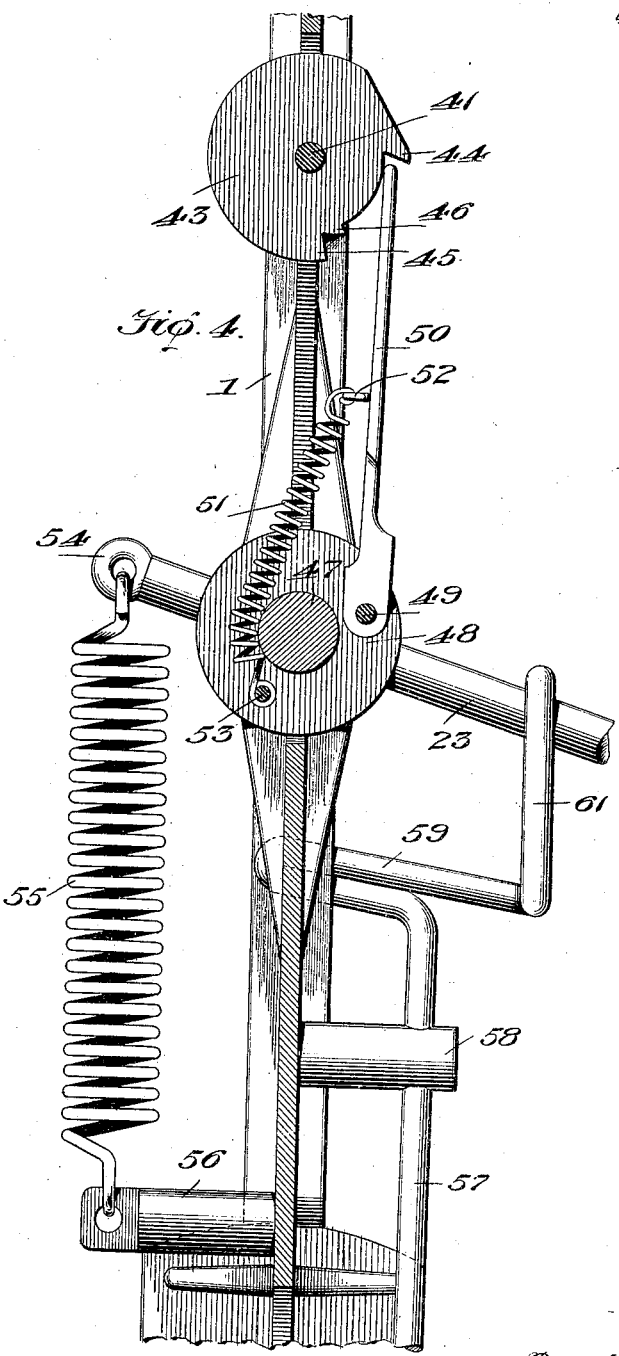

PERCY L. BLASSER, OF YORK, PENNSYLVANIA.

FILM-REWINDER.

993,337. Specification of Letters Patent. Patented May 30, 1911.

Application filed June 7, 1910. Serial No. 565,521.

*To all whom it may concern:*

Be it known that I, PERCY L. BLASSER, a citizen of the United States, residing at York, in the county of York and State of Pennsylvania, have invented certain new and useful Improvements in Film-Rewinders, of which the following is a specification.

This invention relates to machines for rewinding motion picture films, and one of the principal objects of the invention is to provide a machine of simple construction for rewinding films on the primary reel for another exhibition of the pictures. Owing to the fragile character of these films a machine which will properly rewind said film must be delicately adjusted as to the amount of friction required to prevent the breaking of the films and to, at the same time, prevent the too free running of the film from the secondary to the primary reel. Too great friction would break or separate the film, while too little friction would let the film run off too rapidly to properly rewind it upon the primary reel.

One of the principal objects of my invention is to provide a machine in which the friction shall be automatically regulated to properly rewind the films without danger of breaking and without feeding the film too rapidly to the primary reel.

Another object of my invention is to provide, in a machine of the character referred to, means whereby the reeling operation would cease automatically in case of breakage of the film.

Still another object of my invention is to provide, reliable and efficient means for giving the required tension to the film during the rewinding operation, and to provide automatic means for stopping the machine after the film has been entirely rewound.

Still another object of my invention is to provide automatically operated friction devices to regulate the speed of the rewinding operation, said devices comprising primary and secondary friction devices which are brought into play automatically and which are thrown into operation in case of breakage of the film or at the end of the rewinding operation.

Figure 1:
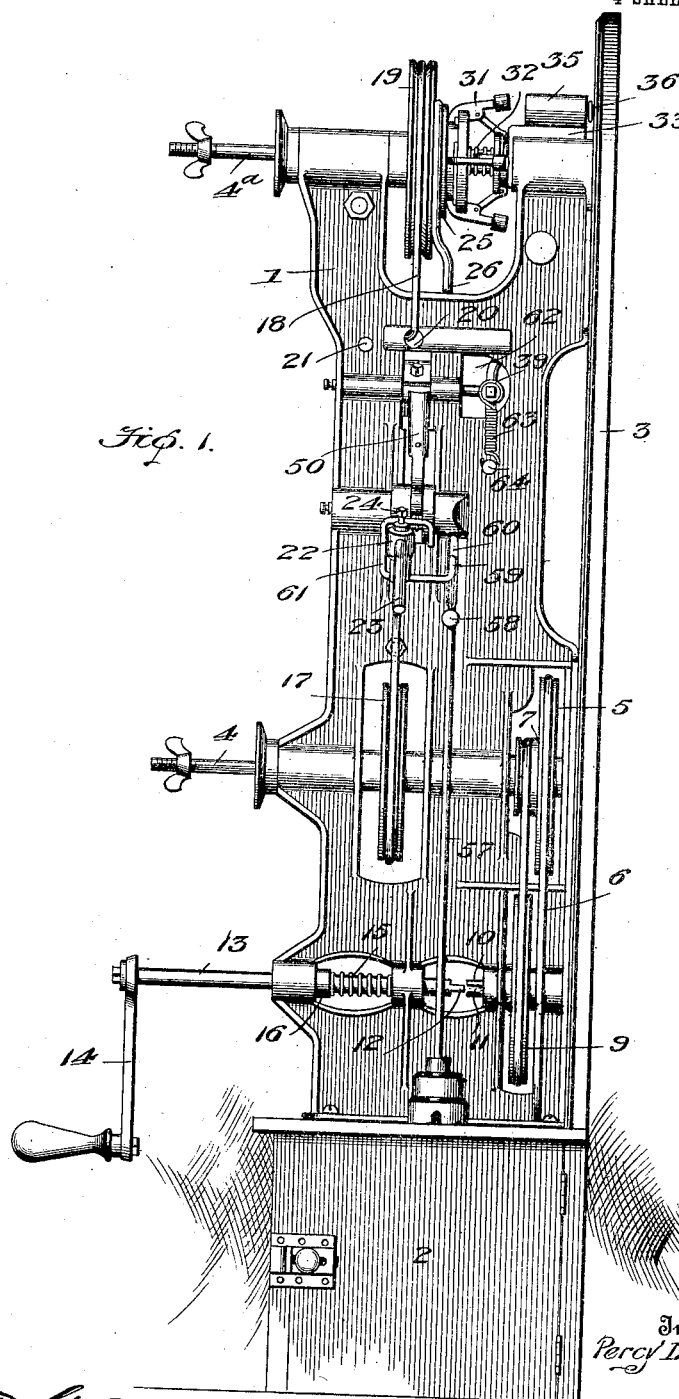
Figure 2:
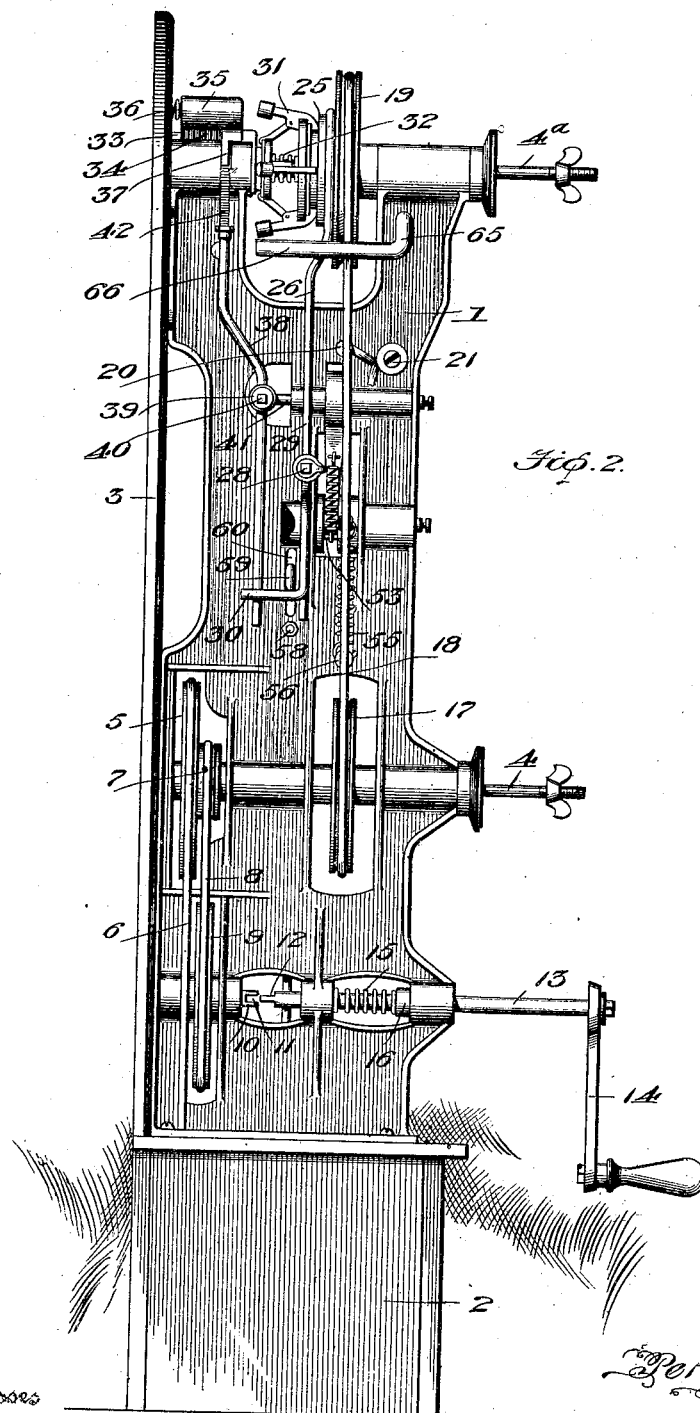
Figure 3:
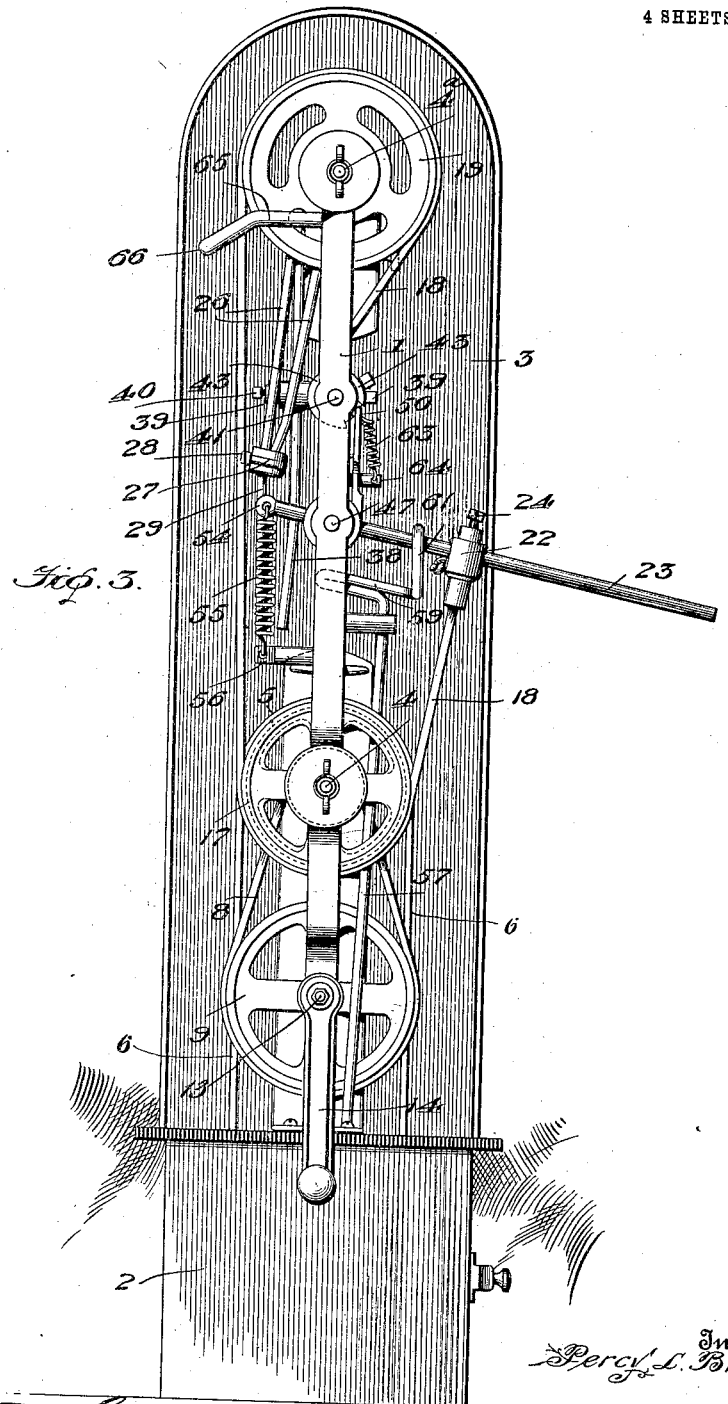

These and other objects may be attained by means of the construction illustrated in the accompanying drawings, in which, Figure 1 is a view in elevation looking at one side of a machine made in accordance with my invention. Fig. 2 is a similar view looking at the opposite side of said machine. Fig. 3 is a front elevation of the machine. Fig. 4 is a detail elevation and partial section of the starting and stopping mechanism.

Referring to the drawings for a more particular description of my invention the numeral 1 designates the frame of the machine comprising a vertically disposed support for the operating mechanism, said frame being secured upon a suitable cabinet 2 for containing an electrical or other suitable motor. Formed on or secured to one side of the frame is a plate 3 adapted to lie flat against a wall or other support for holding the machine firmly in position for use. A spindle 4, designed to receive the primary or empty reel is properly journaled in the frame and connected up to the motor by means of a grooved pulley 5, upon which the belt or band 6 is placed, said belt or band being connected to the drive shaft of the motor within the cabinet 2. On the spindle 4, at the side of the pulley 5, is a smaller grooved pulley 7, and a belt or band 8 extends from this pulley to a grooved pulley 9 on a stub shaft 10, journaled in the frame, and bifurcated at its end, as at 11, to receive the flattened end 12 of a shaft 13 having a crank 14 secured to its outer end. A spring 15 surrounds the shaft 13 and bears at one end against a collar on the frame, while its opposite end bears against a collar 16 on the shaft. The spring 15 normally disconnects the reduced end 12 from the bifurcated portion 13 of the stub shaft 10. By means of this arrangement the film may be rewound by hand instead of by the motor in the cabinet 2. On the spindle 4 a grooved pulley 17 is mounted and a friction band 18 extends around said pulley and over a pulley 19 mounted upon the spindle 4ª, which spindle is adapted to receive the full reel of the film to be rewound upon the reel placed upon the spindle 4. The friction band 18 extends through an opening 20 in the frame, and one end of said band is secured by means of a screw bolt 21 to the frame, while the opposite end is connected to a collar 22 adjustably mounted on the starting handle 23 of the machine, said collar being provided with a set screw 24, by means of which it can be adjustably held in position on said starting handle. On the spindle 4ª at the side of the pulley 19 is a grooved friction pulley 25, and partially surrounding said friction pulley is a friction device comprising two members 26, which are adjustably connected together by means of a sliding collar 27 connected to said two members by means of a set screw 28, which can be tightened up to increase the friction between said members 26 and the friction pulley 25. One of the members 26 is provided with an extension 29 provided with a finger 30 extending at right angles to the extension 29 at its lower end, for a purpose which will presently appear.

Mounted upon the spindle 4ª is a centrifugal spring governor 31 of the usual or any suitable construction, said governor being provided with a spring 32. Mounted in a guide on the frame is a sliding spring actuated follower 33 having a series of rack teeth 34 upon one side thereof and a suitable casing 35 at the top to contain a spring 36, one end of which bears against the plate 3. The tension of the spring 36 is exerted to urge the follower against the governor, as the arms of said governor are thrown out by the revolution of the spindle 4. A pawl 37 is rotatably mounted upon a rod 38, which passes through a sleeve 39, provided with a set screw 40 for holding the rod 38 firmly in connection with said sleeve. The sleeve 39 is formed on or connected to one end of a shaft 41 journaled in the frame. A spring 42 surrounds the shank of the pawl 37 and normally holds the nose of said pawl in connection with the notches in the rack 34, when the machine is winding the film. Secured to the shaft 41, is a cam 43, said cam having a projection 44 and a shoulder 45. Adjacent to the shoulder 45 is a stop projection 46. The purpose of the pawl, 37, is to hold the shaft, 41, against rotation, and to permit the cam, 43, to partially rotate when said pawl 37, is disconnected from the rack teeth, 34. The governor serves to regulate the speed of rotation of the spindle, 4ª.

Referring to Fig. 4 it will be seen that a stub shaft 47, mounted in the frame, is provided with a collar 48. Pivotally mounted at 49 on said collar is a spring actuated dog 50, the upper end of which is adapted to engage the shoulder 45 and the notch adjacent thereto after the starting handle 23 is thrown downward.

A spring 51 is connected to an eye 52 on the dog 50, the opposite end of said spring being secured to a pin 53 on the collar 48. The starting handle 23 extends through the collar 48 and the end of said starting handle is provided with an eye 54, and a spring 55 is connected at one end to said eye, while the opposite end of said spring is connected to a suitable bracket 56 on the frame. The stress of this spring is to draw the eye 54 down toward the bracket 56. A starting rod 57 is mounted to slide in a stud 58 projecting from the frame, said starting rod extending through the top of the cabinet 2 and connected by suitable mechanism to the motor. At the upper end the starting rod is provided with a guide member 59 which extends through a slot 60 in the frame. The guide rod is provided at its upper end with an angular member 61, through which the starting handle 23 extends. The sleeve 39 extends through an opening 62 in the frame and connected to said sleeve upon the end opposite the set screw 40 is a spring 63, the opposite end of which is connected to a stud 64 projecting from the frame. The tension of the spring 63 is exerted to hold the pawl 37 in connection with the rack 34. Projecting outward from the frame is a rod 65 having a laterally bent stop arm 66 which serves to limit the angular movement of the friction members 26. When the film has been drawn from the reel on the spindle 4ª to the reel on spindle 4, the speed of rotation of the spindle 4ª is constantly accelerated owing to the fact that the film being wound upon the spindle 4 constantly increases the distance between the spindle and the outer layer of the film.

The operation of my film rewinder may be briefly described as follows: The reel containing the film to be rewound is placed upon the spindle 4ª and secured in position to rotate with said spindle. The primary reel on which the film is to be wound is placed upon the spindle 4 and secured thereon to revolve with said spindle. The starting arm 23 is then pushed downward to depress the starting rod 57 and start the motor. When the rod 23 is pushed downward the friction band 18 is loosened on the pulleys 17 and 19. When the film has been drawn from the reel on spindle 4ª to the reel on spindle 4 a friction is created by the members 26 on the grooved friction pulley 25, thus rotating the members 26 in a clockwise direction (Fig. 3) until they come to a stop against the stop arm 66. Now as the reel on spindle 4 fills, the film increases its distance from the center, thus increasing the speed of the spindle 4ª as the film comes closer to the center of said spindle, and the speed of this spindle is steadily increased until the film is entirely rewound. The governor arms are thrown out by the speed of the spindle 4ª and the follower 33 is urged against the governor and the pawl 37 engages the teeth 34. The governor arms open to their full extent at about one-half the speed attained by the spindle 4ª, and thus the governor becomes practically a fly wheel for said spindle, while the friction members 26 insure an angular accelerated velocity to said spindle 4ª. Should the film break the drawing action on the reel of spindle 4ª would cease and the governor arms would close; the finger 30 would drop. The pawl 37 would be thrown out to move the cam 43, thus throwing the pawl 50 out of the notch in said cam. The movement of the sleeve 39 would slightly rotate the cam 43 to disengage the pawl 50 and the spring 55 would throw the outer end of the starting arm 23 upward into contact with the upper portion of the rectangular member 61 of the starting rod, thus withdrawing the rod from the cabinet and stopping the motor. When the starting arm 23 is raised the friction band 18 is tightened upon the grooved pulleys 17 and 19, thus gradually stopping the rotation of the spindles. When the film is entirely rewound on the reel connected to the spindle 4, there being no drawing action on the spindle 4ª, the governor closes and the friction members 26 drop and stop the machine automatically. Should it be found necessary to use a hand winding device the crank 14 is actuated.

From the foregoing it will be obvious that a machine made in accordance with my invention will rewind films without requiring the services of a constant attendant. When the films have been placed in position on the machine and the motor is started no further attention is required unless the film should break or be torn. After the film has been rewound the machine automatically stops.

My invention is comparatively simple in construction, cannot readily get out of order, is strong, durable and efficient for its purpose, and can be manufactured at a comparatively low cost.

I claim:

1. In a film rewinding machine, the combination of a frame, a spindle journaled in the frame to receive an empty reel, means for rotating said spindle, an idle spindle mounted in the frame for holding a reel containing the film, a friction device for the last mentioned spindle, a starting device, and means whereby the rewinding operation is stopped automatically when the rewinding operation is completed.

2. In a machine of the character decribed, the combination of a frame, a spindle mounted for rotation in said frame, means for rotating said spindle, an idle spindle journaled in the frame, a governor on said idle spindle, friction members mounted on said spindle, a friction band passing over a pulley on said spindle, a starting handle provided with an adjusting device for the end of said friction band, and means for stopping the rotation of the spindles in case of breakage of the film or after the film has been entirely rewound.

3. In a machine of the character described, a frame, a spindle mounted for rotation in said frame, means for revolving said spindle, an idle spindle journaled in the frame, a pulley mounted on said spindle, a friction band passing around said pulley, a starting arm, one end of said friction band being adjustably connected to the frame, and the opposite end to a sliding adjusting device on the starting arm, a governor on the idle spindle, and means whereby friction is applied to the idle spindle after the film has been rewound, or in case of breakage or tearing of the film.

4. In a machine of the character described, a frame, a spindle mounted for rotation in said frame, a motor for rotating said spindle, an idle spindle journaled in the frame, a friction pulley on said spindle, a friction band passing over said pulley, a starting arm, one end of said friction band being secured adjustably to the frame of the machine, and the opposite end of said band being secured to the sliding adjusting device on the starting arm, a centrifugal governor on the idle spindle, a spring actuated slide on said spindle, a rack on said slide, a pawl for engaging said rack, a rod upon which said pawl is mounted, a friction pulley mounted on the idle spindle, a friction device, bearing on said pulley, a finger on said friction device, and means whereby when the film breaks or when the film is rewound the motor will be stopped, friction will be applied to the idle spindle, and the governor will be thrown out of operative position.

5. A film rewinding machine comprising a frame, a spindle mounted for rotation in the frame, means for rotating said spindle, an idle spindle in the frame, means for connecting a reel to each of said spindles, a friction pulley on the idle spindle, a friction band passing partially around said pulley, a starting arm, one end of said friction band being connected to said frame, the opposite end being connected to a sliding adjusting device upon the starting arm, a cam mounted to partially rotate in the frame, a pawl actuated by the starting arm to engage said cam, a governor on the idle spindle, a slide on the frame, a pawl for holding said slide in position, a friction device mounted on a pulley on the idle spindle, a finger on said friction device for engaging the rod upon which the pawl is mounted, a stop arm for the friction device, and means whereby friction is applied to the idle spindle, and the machine is stopped after the rewinding operation or in case of breakage of the film.

6. In a machine of the character described, the combination of a rotatable spindle, an idle spindle, a governing device for the idle spindle, a spring actuated slide, a friction band mounted on a pulley on the idle spindle, a friction device mounted on a pulley on said spindle, and means whereby the winding operation is stopped and friction is applied automatically to the idle spindle in case of breakage of the film.

In testimony whereof I affix my signature in presence of two witnesses.

PERCY L. BLASSER.

Witnesses:
WILLIAM H. KUHL,
DENNIS HENSEL.

Copies of this patent may be obtained for five cents each, by addressing the "Commissioner of Patents, Washington, D. C."